United States Patent
Schlub et al.

(10) Patent No.: US 8,781,420 B2
(45) Date of Patent: Jul. 15, 2014

(54) ADJUSTABLE WIRELESS CIRCUITRY WITH ANTENNA-BASED PROXIMITY DETECTOR

(75) Inventors: Robert W. Schlub, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 597 days.

(21) Appl. No.: 12/759,243

(22) Filed: Apr. 13, 2010

(65) Prior Publication Data

US 2011/0250928 A1 Oct. 13, 2011

(51) Int. Cl.
*H04B 7/04* (2006.01)

(52) U.S. Cl.
USPC .................................. 455/127.2; 455/115.1

(58) Field of Classification Search
USPC ........... 455/101, 115.1, 121, 127.1, 269, 272, 455/273, 276.1, 277.1, 277.2, 278.1, 296
See application file for complete search history.

(56) References Cited

U.S. PATENT DOCUMENTS

| | | | |
|---|---|---|---|
| 5,337,353 A | | 8/1994 | Boie et al. |
| 5,451,965 A | | 9/1995 | Matsumoto |
| 5,463,406 A | | 10/1995 | Vannatta et al. |
| 5,650,597 A | | 7/1997 | Redmayne |
| 5,748,054 A | | 5/1998 | Tonegawa et al. |
| 5,777,693 A | | 7/1998 | Kishigami et al. |
| 5,805,067 A | * | 9/1998 | Bradley et al. ................ 340/635 |
| 5,826,458 A | * | 10/1998 | Little ............................... 73/73 |
| 5,854,972 A | | 12/1998 | Pennock et al. |
| 5,864,316 A | * | 1/1999 | Bradley et al. ................ 342/359 |
| 5,905,467 A | | 5/1999 | Narayanaswamy et al. |
| 5,956,626 A | * | 9/1999 | Kaschke et al. ........... 455/115.1 |
| 6,242,982 B1 | | 6/2001 | Ibelings et al. |
| 6,275,684 B1 | | 8/2001 | Kaneko et al. |
| 6,285,893 B1 | | 9/2001 | Keirinbou |
| 6,329,958 B1 | | 12/2001 | McLean et al. |
| 6,380,899 B1 | | 4/2002 | Madsen et al. |
| 6,408,193 B1 | | 6/2002 | Katagishi et al. |

(Continued)

FOREIGN PATENT DOCUMENTS

| | | |
|---|---|---|
| CN | 1343380 | 4/2002 |
| CN | 101330162 | 12/2008 |

(Continued)

OTHER PUBLICATIONS

U.S. Appl. No. 12/061,159, filed Apr. 2, 2008, Ligtenberg et al.

(Continued)

*Primary Examiner* — Blane J Jackson
(74) *Attorney, Agent, or Firm* — Treyz Law Group; G. Victor Treyz; Chih-Yun Wu

(57) ABSTRACT

An electronic device such as a portable electronic device has wireless communications circuitry. Antennas in the electronic device may be used in transmitting radio-frequency antenna signals. A coupler and antenna signal phase and magnitude measurement circuitry may be used to determine when external objects are in the vicinity of the antenna by making antenna impedance measurements. In-band and out-of-band phase and magnitude signal measurements may be made in determining whether external objects are present. Additional sensors such as motion sensors, light and heat sensors, acoustic and electrical sensors may produce data that can be combined with the proximity data gathered using the antenna-based proximity sensor. In response to detecting that an external object such as a user's body is within a given distance of the antenna, the electronic device may reduce transmit powers, switch antennas, steer a phased antenna array, switch communications protocols, or take other actions.

16 Claims, 9 Drawing Sheets

(56) References Cited

U.S. PATENT DOCUMENTS

| | | | |
|---|---|---|---|
| 6,456,856 B1* | 9/2002 | Werling et al. ............ 455/575.5 |
| 6,483,463 B2 | 11/2002 | Kadambi et al. |
| 6,529,088 B2* | 3/2003 | Lafleur et al. ................ 333/17.1 |
| 6,590,539 B2 | 7/2003 | Shinichi |
| 6,611,227 B1 | 8/2003 | Nebiyeloul-Kifle et al. |
| 6,657,595 B1 | 12/2003 | Alameh et al. |
| 6,678,532 B1* | 1/2004 | Mizoguchi ................ 455/550.1 |
| 6,757,267 B1 | 6/2004 | Evans et al. |
| 6,761,316 B2 | 7/2004 | Bridgelall et al. |
| 6,806,835 B2 | 10/2004 | Iwai et al. |
| 6,862,433 B2 | 3/2005 | Callaway |
| 6,879,293 B2 | 4/2005 | Sato |
| 6,959,209 B2 | 10/2005 | Fang |
| 6,978,121 B1 | 12/2005 | Lane et al. |
| 6,985,113 B2 | 1/2006 | Nishimura et al. |
| 7,016,686 B2 | 3/2006 | Spaling |
| 7,039,435 B2 | 5/2006 | McDowell et al. |
| 7,050,010 B2 | 5/2006 | Wang et al. |
| 7,053,629 B2* | 5/2006 | Nevermann ................... 324/644 |
| 7,109,945 B2 | 9/2006 | Mori |
| 7,113,087 B1 | 9/2006 | Casebolt |
| 7,116,959 B1 | 10/2006 | Link et al. |
| 7,146,139 B2 | 12/2006 | Nevermann |
| 7,149,483 B1 | 12/2006 | Reinisch et al. |
| 7,181,251 B2 | 2/2007 | Stohr et al. |
| 7,187,332 B2 | 3/2007 | Kezys et al. |
| 7,499,722 B2 | 3/2009 | McDowell et al. |
| 7,522,846 B1 | 4/2009 | Lewis et al. |
| 7,557,760 B2 | 7/2009 | Chang et al. |
| 7,633,076 B2* | 12/2009 | Huppi et al. ............. 250/559.36 |
| 7,826,875 B2* | 11/2010 | Karaoguz et al. ............. 455/574 |
| 7,834,813 B2 | 11/2010 | Caimi et al. |
| 8,159,399 B2 | 4/2012 | Dorsey |
| 2002/0027474 A1 | 3/2002 | Bonds |
| 2002/0060645 A1 | 5/2002 | Shinichi |
| 2002/0094789 A1 | 7/2002 | Harano |
| 2002/0123309 A1 | 9/2002 | Collier et al. |
| 2003/0062907 A1 | 4/2003 | Nevermann |
| 2003/0064732 A1 | 4/2003 | McDowell et al. |
| 2003/0186728 A1 | 10/2003 | Manjo |
| 2003/0197597 A1* | 10/2003 | Bahl et al. ..................... 340/7.58 |
| 2003/0210203 A1 | 11/2003 | Phillips et al. |
| 2003/0218993 A1 | 11/2003 | Moon et al. |
| 2004/0176083 A1 | 9/2004 | Shiao et al. |
| 2004/0189542 A1 | 9/2004 | Mori |
| 2004/0222926 A1 | 11/2004 | Kontogeorgakis et al. |
| 2005/0124305 A1 | 6/2005 | Stichelbout |
| 2005/0245204 A1 | 11/2005 | Vance |
| 2006/0161871 A1 | 7/2006 | Hotelling et al. |
| 2006/0205368 A1 | 9/2006 | Bustamante et al. |
| 2006/0232468 A1 | 10/2006 | Parker et al. |
| 2006/0244663 A1 | 11/2006 | Fleck et al. |
| 2007/0188375 A1 | 8/2007 | Richards et al. |
| 2008/0165063 A1 | 7/2008 | Schlub et al. |
| 2008/0248837 A1 | 10/2008 | Kunkel |
| 2008/0309836 A1 | 12/2008 | Sakama et al. |
| 2008/0316120 A1 | 12/2008 | Hirota et al. |
| 2009/0000023 A1 | 1/2009 | Wegelin et al. |
| 2009/0096683 A1* | 4/2009 | Rosenblatt et al. ........... 343/702 |
| 2009/0174611 A1 | 7/2009 | Schlub et al. |
| 2009/0295648 A1 | 12/2009 | Dorsey et al. |
| 2010/0167672 A1 | 7/2010 | Ahn et al. |
| 2011/0012793 A1 | 1/2011 | Amm et al. |
| 2011/0012794 A1 | 1/2011 | Schlub et al. |
| 2011/0212746 A1* | 9/2011 | Sarkar et al. ............... 455/552.1 |
| 2011/0250928 A1 | 10/2011 | Schlub et al. |

FOREIGN PATENT DOCUMENTS

| | | |
|---|---|---|
| DE | 102005035935 | 2/2007 |
| EP | 0 564 164 | 10/1993 |
| EP | 1298809 | 4/2003 |
| EP | 1 469 550 | 10/2004 |
| EP | 1 524 774 | 4/2005 |
| EP | 1564896 | 8/2005 |
| GB | 2 380 359 | 4/2003 |
| JP | 2003179670 | 6/2003 |
| JP | 2003209483 | 7/2003 |
| JP | 2003216318 | 7/2003 |
| JP | 200667061 | 3/2006 |
| JP | 2006218083 | 8/2006 |
| JP | 2008009759 | 1/2008 |
| JP | 2008537615 | 9/2008 |
| JP | 2009032570 | 2/2009 |
| WO | 0131733 | 5/2001 |
| WO | 02/05443 | 1/2002 |
| WO | 2005112280 | 11/2005 |
| WO | 2007116790 | 10/2007 |
| WO | 2008/078142 | 7/2008 |
| WO | 2009022387 | 2/2009 |
| WO | 2009149023 | 12/2009 |

OTHER PUBLICATIONS

U.S. Appl. No. 11/969,684, filed Jan. 4, 2008, Schlub et al.
U.S. Appl. No. 12/110,260, filed Apr. 25, 2008, Sorenson et al.
U.S. Appl. No. 12/132,549, filed Jun. 3, 2008, Dorsey et al.
U.S. Appl. No. 12/632,697, filed Dec. 7, 2009, Schlub et al.
U.S. Appl. No. 12/207,326, filed Sep. 9, 2008, Caballero et al.
U.S. Appl. No. 12/422,196, filed Apr. 10, 2009, John G. Dorsey.
"CapTouch Programmable Controller for Single-Electrode Capacitance Sensors", AD7147 Data Sheet Rev. B, [online], Analog Devices, Inc., [retrieved on Dec. 7, 2009], <URL: http://www.analog.com/static/imported-files/data_sheets/AD7147.pdf>.
U.S. Appl. No. 12/632,695, filed Dec. 7, 2009, Amm et al.
Prace et al., U.S. Appl. No. 12/861,640, filed Aug. 23, 2010.
Breeden, "Audible Message Alert With Ear Proximity Detector for Portable Handsets," Motorola, Inc. Technical Developments, vol. 12, Apr. (p. 102-103).
Myllmaki et al., "Capacitive recognition of the user's hand grip position in mobile handsets", Progress in Electromagnetics Research B, vol. 22, 2010, pp. 203-220.

* cited by examiner

ADJUSTABLE WIRELESS CIRCUITRY WITH ANTENNA-BASED PROXIMITY DETECTOR

BACKGROUND

This relates generally to wireless communications circuitry, and more particularly, to electronic devices that have wireless communications circuitry whose operation may be adjusted based on the proximity of the electronic devices to external objects.

Electronic devices such as computers and handheld electronic devices are becoming increasingly popular. Devices such as these are often provided with wireless communications capabilities. For example, electronic devices may use long-range wireless communications circuitry such as cellular telephone circuitry to communicate using cellular telephone bands. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. To satisfy regulatory guidelines for maximum emitted power, it may be desirable to limit the radio-frequency output of an electronic device. Care must be taken, however, to ensure that the proper wireless operation of the electronic device is not disrupted. If emitted wireless signal strengths are overly limited, a device may not function satisfactorily.

In view of these considerations, it would be desirable to provide improved wireless circuitry for electronic devices.

SUMMARY

Electronic devices such as portable electronic devices may be provided with one or more antennas. The antennas may operate in a common communications band (e.g., when implementing an antenna diversity arrangement) or may operate in separate communications bands. An array of antennas may be controlled using phase controllers to implement a phased antenna array capable of beam steering. Antennas may be provided with tunable matching networks, tunable feeds, tunable antenna resonating elements, and adjustable tuning circuits.

The electronic device may determine whether a user's body or other external object is within a given distance of an antenna by making antenna impedance measurements. The antenna impedance measurements may be made using signal phase and magnitude monitoring circuitry that is coupled to the antenna.

The electronic device may also include other sensors such as thermal sensors, infrared heat sensors, motion sensors, capacitance sensors, ambient light sensors, infrared light proximity sensors, acoustic sensors, cameras, electrical (resistance) sensors, etc. Data from each of these sensors may be used in addition to the antenna impedance measurement data to help accurately determine whether the external object is in the vicinity of the antenna.

Transceiver and power amplifier circuitry may be used in transmitting radio-frequency antenna signals through the antenna. A communications protocol, transmit data rate, and a given communications band may be used when transmitting signals.

Storage and processing circuitry may process information from an antenna-based proximity sensor and from other sensors and sources of data within the electronic device to determine when external objects are within a given distance of the antennas in the device are how to respond. Appropriate actions that may be taken when an external object is detected include adjustments to transmit power through the antenna, adjustments to the type of communications protocol that is being used, adjustments to the rate at which data is being wirelessly transmitted, and adjustments to the communications band that is being used for wireless transmissions. Antennas may be selectively disabled and may have their powers adjusted individually. In a phased antenna array, the direction in which the antenna array is operating may be adjusted. The antennas in the device may also be tuned in response to the detection of external objects by adjusting matching circuits, antenna feed locations, tuning circuits, and adjustable switches that control the size and shape of the active portions of antenna resonating elements within the antennas.

Further features of the invention, its nature and various advantages will be more apparent from the accompanying drawings and the following detailed description of the preferred embodiments.

DETAILED DESCRIPTION

Figure 1:
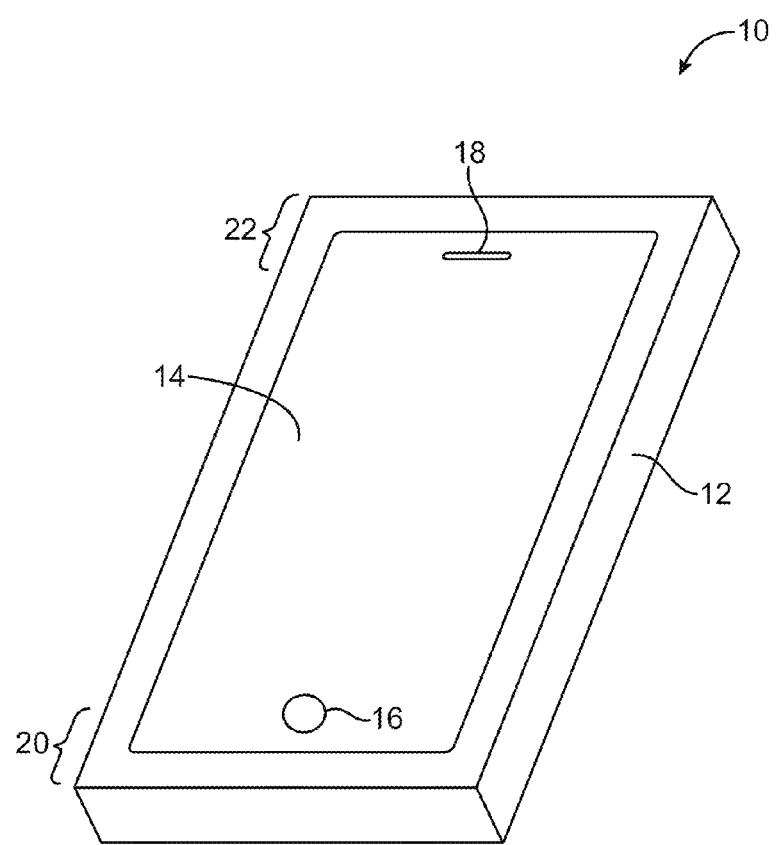
FIG. 1 is a perspective view of an illustrative electronic device with wireless communications circuitry in accordance with an embodiment of the present invention.

Electronic devices may be provided with wireless communications circuitry. The wireless communications circuitry may be used to support wireless communications such as long-range wireless communications (e.g., communications in cellular telephone bands) and short-range communications (i.e., local area network links such as WiFi® links, Bluetooth® links, etc.). The wireless communications circuitry may include one or more antennas.

The electronic devices may include proximity sensors that are implemented using circuitry that monitors antenna signals. A proximity sensor of this type may, for example, discern whether a user's hand or other body part is in the vicinity of an antenna in an electronic device. Other sensor data may also be gathered by the device.

Processing circuitry may be used to process the antenna signal proximity sensor data and other data to determine when it is necessary to adjust the wireless circuitry. The processing circuitry may decide to adjust the wireless circuitry whenever appropriate criteria have been satisfied. Examples of criteria that might be used to determine when a wireless circuit adjustment is appropriate include criteria specifying how close a user's body may be located to a particular antenna as determined by a radio-frequency antenna signal proximity sensor, which antennas in an array are close to a user's body, how a device is being oriented, what type of applications are currently running on the device, whether the device is moving, whether an external object appears to be in the vicinity of the device as measured by a light sensor, heat sensor, infrared light or heat sensor, acoustic sensor, or capacitive sensor, etc.

After gathering proximity data and other suitable data using one or more of these sensors, the processing circuitry may take appropriate action. Examples of actions that may be taken include adjusting the amount of radio-frequency power that is transmitted through each antenna, switching to a desired antenna mode (e.g., switching between a mode in which multiple antennas are used to a mode in which a single antenna is used or vice versa), adjusting a phased antenna array (e.g., to steer an antenna away from the user's body), adjusting which communications bands are active, adjusting how fast data is transmitted, delaying data transmission for particular types of data, switching which communications protocol is being used, issuing an alert, prompting a user to take a particular action such as reorienting the device, etc. Proximity data may sometimes be a particularly reliable form of data to use in controlling radio-frequency emissions from wireless circuitry, but ancillary data such as data from other sensors and data on the current operation of a device may be used to increase the accuracy and appropriateness of any actions that are taken. Changes in output power and other adjustments that are being made in response to antenna-based proximity sensor data and other gathered data may be made in conjunction with changes in output power that are made in response to transmit power commands received from a cellular network.

Any suitable electronic devices may be provided with wireless circuitry that is controlled in this way. As an example, control techniques such as these may be used in electronic devices such as desktop computers, game consoles, routers, laptop computers, computers embedded in a computer monitor or television, computers that are part of set-top boxes or other consumer electronics equipment, relatively compact electronic devices such as portable electronic devices, etc. The use of portable electronic devices is sometimes described herein as an example. This is, however, merely illustrative. Wireless circuitry may be controlled based on proximity data and other information in any electronic device.

An illustrative portable electronic device in accordance with an embodiment of the present invention is shown in FIG. 1. Portable electronic devices such as illustrative portable electronic device 10 of FIG. 1 may be laptop computers or small portable computers such as ultraportable computers, netbook computers, and tablet computers. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices are handheld electronic devices such as cellular telephones. Other examples of handheld devices include media players with wireless communications capabilities, handheld computers (also sometimes called personal digital assistants), remote controllers, global positioning system (GPS) devices, and handheld gaming devices. Handheld devices and other portable devices may, if desired, include the functionality of multiple conventional devices. Examples of multi-functional devices include cellular telephones that include media player functionality, gaming devices that include wireless communications capabilities, cellular telephones that include game and email functions, and handheld devices that receive email, support mobile telephone calls, and support web browsing. These are merely illustrative examples. Device 10 of FIG. 1 may be any suitable portable or handheld electronic device.

Device 10 includes housing 12. Housing 12, which is sometimes referred to as a case, may be formed of any suitable materials including plastic, glass, ceramics, carbon-fiber composites and other composites, metal, other suitable materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass member may cover the surface of display 14. Buttons such as button 16 may pass through openings in the cover glass. Openings may also be formed in the cover glass of display 14 to form a speaker port such as speaker port 18. Openings in housing 12 may be used to form input-output ports, microphone ports, speaker ports, button openings, etc.

Wireless communications circuitry in device 10 may be used to form remote and local wireless links. One or more antennas may be used during wireless communications.

Single-band and multiband antennas may be used. For example, a single-band antenna may be used to handle Bluetooth® communications at 2.4 GHz (as an example). As another example, a multiband antenna may be used to handle cellular telephone communications in multiple cellular telephone bands. Other types of communications links may also be supported using single-band and multiband antennas.

If desired, device 10 may use multiple antennas to support an antenna diversity scheme. With this type of arrangement, control circuitry in device 10 may monitor signal quality or sensor data to determine which antenna or antennas are performing best or are otherwise desirable to use (e.g., to satisfy regulatory limits). Based on these considerations, the control circuitry may then choose to use only a subset of the antennas or may otherwise adjust antenna use. If, for example, a sensor or a signal quality measurement determines that one of two antennas in an antenna diversity arrangement has become blocked by an external object such as part of a human body, the control circuitry may temporarily inactivate that antenna.

Device 10 may also use multiple antennas to implement a multiple-input-multiple-output (MIMO) communications protocol (e.g., to enhance data throughput). The control circuitry in device 10 may use proximity data or other data to control operation of the multiple antennas in the MIMO setup. For example, the control circuitry may temporarily switch from MIMO operation to a protocol that uses only a single antenna or may switch from a four-antenna MIMO scheme to a two-antenna MIMO scheme, etc.

Device 10 may include a phased antenna array. The array may include multiple antenna elements (i.e., multiple antennas). Control circuitry may be used to control the signals that are routed to and from the antenna elements (e.g., by controlling signal phases). The control circuitry can alter the direction in which the antenna operates. If, for example, it is desired to point the antenna in a first direction, the control circuitry can use a first group of antenna element phase settings. If it is desired to point the antenna in a second direction that is different than the first direction, the control circuitry can use a distinct second group of phase settings. Using this approach, the power of the radio-frequency signals that are emitted by the antenna array can be steered to avoid or minimize emissions into external objects (e.g., to comply with regulatory limits by avoiding radio-frequency emissions into human tissue).

Combinations of these approaches may also be used. For example, the control circuitry in device 10 may use proximity sensor information or other sensor data to determine the location of external objects relative to the device. The control circuitry can also ascertain what tasks are being performed by the device and what tasks are scheduled to be performed or are likely to be performed. As an example, the control circuitry can determine that a user is currently using device 10 for a telephone call or can determine that an email message has been queued up for transmission or is likely to be sent (e.g., because an email application is currently open). Using this collection of information, the control circuitry can balance the current and future needs of the user against the need to regulate emitted power. The control circuitry may take a combination of corresponding actions including switching antennas in an antenna diversity scheme, changing which wireless communications protocol (algorithm) is used, changing which wireless communications mode is used while complying with the same overall protocol, changing the settings in a beam forming phase antenna array so that emitted signals are directed towards a new location, etc.

Antennas in device 10 may be used to support any communications bands of interest. For example, device 10 may include antenna structures for supporting local area network communications, voice and data cellular telephone communications, global positioning system (GPS) communications, Bluetooth® communications, etc. As an example, a lower antenna in region 20 of device 10 may be used in handling voice and data communications in one or more cellular telephone bands, whereas an upper antenna in region 22 of device 10 may provide coverage in a first band for handling Global Positioning System (GPS) signals at 1575 MHz and a second band for handling Bluetooth® and IEEE 802.11 (wireless local area network) signals at 2.4 GHz (as examples). Additional antennas may be provided to implement antenna diversity schemes, phased antenna arrays (e.g., at 60 GHz), additional bands, etc.

Figure 2:
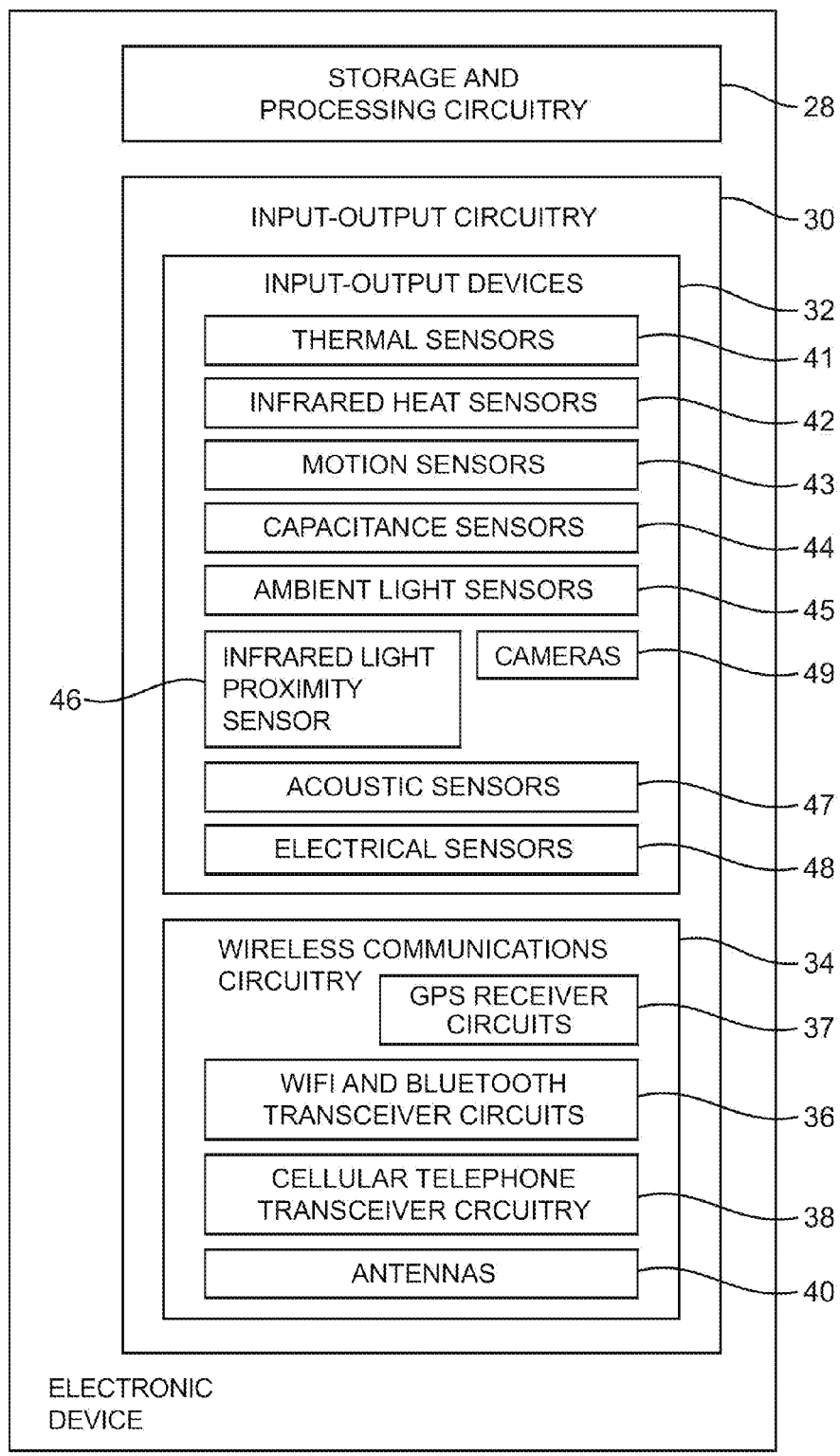
FIG. 2 is a schematic diagram of an illustrative electronic device with wireless communications circuitry in accordance with an embodiment of the present invention.

A schematic diagram of an illustrative electronic device is shown in FIG. 2. Device 10 of FIG. 2 may be a portable computer such as a portable tablet computer, a mobile telephone, a mobile telephone with media player capabilities, a handheld computer, a remote control, a game player, a global positioning system (GPS) device, a combination of such devices, or any other suitable electronic device.

As shown in FIG. 2, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 30 may be used to allow data to be supplied to device 10 and to allow data to be provided from device 10 to external devices. Input-output devices 32 such as touch screens and other user input interface are examples of input-output circuitry 32. Input-output devices 32 may also include user input-output devices such as buttons, joysticks, click wheels, scrolling wheels, touch pads, key pads, keyboards, microphones, cameras, etc. A user can control the operation of device 10 by supplying commands through such user input devices. Display and audio devices such as display 14 (FIG. 1) and other components that present visual information and status data may be included in devices 32. Display and audio components in input-output devices 32 may also include audio equipment such as speakers and other devices for creating sound. If desired, input-output devices 32 may contain audio-video interface equipment such as jacks and other connectors for external headphones and monitors.

Input-output devices 30 may include sensors. Data from sensors may be used to control the operation of device 10. For example, data from sensors in device 10 may be used to control screen brightness, the orientation of information on screen 14, the operation of wireless circuitry, etc.

The sensors in device 10 may include thermal sensors 41. Thermal sensors 41 may be used to detect where and when a user is touching device 10. For example, thermal sensors 41 may be used to monitor when a user is holding device 10 in the user's hand or may be used to monitor when device 10 is resting on the user's lap. Multiple thermal sensors 41 may be provided to determine where a user's body is contacting device 10. There may be, for example, a thermal sensor associated with each of multiple antennas in device 10. If a temperature rise is measured near one of the antennas, the power of that antenna may be reduced or other appropriate action may be taken. Sensors 41 may be implemented using thermocouples, bimetallic temperature sensors, solid state devices, or other suitable temperature sensors.

The sensors in device 10 may also include infrared heat sensors 42. Heat sensors 42 may measure heat using thermal imaging techniques (i.e., by detecting the emitted infrared light from an object that is characteristic of the object's heat).

If desired, Peltier effect coolers, heat sinks, or other devices may be used to cool infrared heat sensors 42 to reduce noise. As with thermal sensors 41, infrared heat sensors 42 may be used to detect whether a user is touching device 10. Infrared heat sensors 42 may, for example, be used to detect when a user is holding device 10 or is resting device 10 on the user's lap. More than one infrared heat sensor 42 may be provided. This allows device 10 to determine where an external object such as a part of a user's body is contacting device 10. Each of the antennas in device 10 may be provided with a respective infrared heat sensor 42. Appropriate action may be taken when heat is detected adjacent to a particular antenna. For example, the antenna may be temporarily inactivated. Infrared heat sensors 42 may be implemented using semiconductor devices or other suitable infrared heat sensor equipment. Heat sensors 42 may operate in the near-infrared band (i.e., 700 nm to 1400 nm), or may operate at longer wavelengths such as those in the short-wavelength, mid-wavelength, or long-wavelength infrared bands.

Motion sensors 43, which may sometimes referred to as accelerometers, may be used to detect the earth's gravity and the relative motion of device 10. Motion sensors 43 may therefore be used to determine how device 10 is oriented and whether device 10 is exhibiting movement characteristic of human use. For example, one or more motion sensors 43 may be used in determining whether display 14 lies in a plane parallel to the plane of the earth's surface (as when device 10 is resting flat on a table and is not adjacent to a user's body) or at a non-zero angle relative to the plane of the earth's surface. Sensors 43 can also determine whether device 10 is oriented in a landscape orientation or a portrait orientation. Movement such as periodic transitions between landscape and portrait mode or jiggling motions may be indicative of human use and can be detected using sensors 43.

Capacitance sensors 44 may be integrated into a touch screen such as display 14 or may be provided as stand-alone devices. Capacitance sensors 44, which may sometimes be referred to as touch sensors, may be used to determine when an external object such as a portion of a user's body has come into direct contact with device 10 or has come within a given threshold distance of device 10 (e.g., within 5 mm). Data gathered with capacitance sensors 44 may be used to generate proximity data (i.e., data on the proximity of external objects to device 10), so sensors 44 may sometimes be referred to as proximity sensors or capacitive proximity sensors.

Ambient light sensors 45 may be used to measure the amount of light that is illuminating device 10. Ambient light sensors 45 may be sensitive in the visible spectrum and/or the infrared. Sensors 45 may be used to determine when a user's body is adjacent to particular portions of device 10. For example, an ambient light sensor may be mounted on the front face of device 10 to detect when a user has placed device 10 in the vicinity of the user's head (and has thereby blocked light from reaching the ambient light sensor). Infrared light proximity sensor 46 may similarly use a light detector to determine whether an external object is in the vicinity of device 10. Infrared light proximity sensor 46 may include an active emitter such as an infrared light emitting diode. The diode may be modulated to improve the signal-to-noise ratio of the sensor. When light from the diode is reflected back into an infrared light sensor in the infrared light proximity sensor 46, the sensor can generate an output signal indicating that an object is in the vicinity of sensor 46.

Acoustic sensors 47 may include microphones. The microphone may gather ambient noise readings that are indicative of whether device 10 is being used by a user. For example, a microphone in an acoustic sensor may be used to detect the amount of ambient noise that is present in the vicinity of device 10. If ambient noise or certain types of ambient noise (e.g., voices) are present, device 10 can conclude that device 10 is being used by a user. Acoustic sensors 47 may also include acoustic emitters (e.g., ultrasonic transducers). This type of acoustic sensor may use echolocation techniques to measure the distance between device 10 and surrounding objects and may therefore serve as an acoustic proximity sensor.

Electrical sensors 48 may be used to make electrical measurements. Electrical sensors 48 may include, for example, current sensors, resistance sensors, voltage sensors, etc. Electrodes that are formed as part of electrical sensors 48 or that are electrically connected to sensors 48 may be used in making electrical measurements. As an example, a pair of electrical terminals may be located on portions of housing 12. An electrical sensor may measure the resistance between the electrical terminals. When a user holds device 10 in the user's hand, the electrical sensor may detect a drop in resistance that is indicative of the presence of the user's hand.

If desired, input-output circuitry 30 may include cameras such as cameras 49. Cameras 49 may have image sensor integrated circuits that include two-dimensional arrays of light-sensitive pixels. Image sensors in cameras 49 may have sufficient resolution for forming photographs or may have lower resolution (e.g., for gathering proximity data or other data on the environment of device 10). The image sensors in cameras 49 may be sensitive in the visible spectrum, in the infrared spectrum, etc. Image data that is acquired by cameras 49 may include still images and moving images (video clips). This information may be processed by a general purpose processor, a dedicated image processing circuit, or other circuitry in storage and processing circuitry 28.

Cameras 49 may gather information that is used in determining whether or not a user's body or other external objects are in the vicinity of device 10. Examples of acquired image data that may indicate that a user's body or other external object is in the vicinity of device 10 and antennas in device 10 include images containing a user's face or other identifiable body part, images containing motion, images containing flesh tones, hair, or other human attributes, image data such as video data indicating motion towards the antennas of device 10 or other portion of device 10, dark (black) images and other images in which a camera sensor (i.e., a camera window and camera module lens) in device 10 has been obscured and therefore blocked by a human body part or other external object, etc. This information may be combined with other sensor data to enhance human body detection accuracy.

Sensors such as sensors 41, 42, 43, 44, 45, 46, 47, 48, and 49 are merely illustrative. Other sensors may be used to gather data on the environment and operation of device 10 if desired. These sensors may serve as proximity sensors or may produce information that can be used in conjunction with proximity sensor data to enhance the accuracy of the proximity sensor data. The sensors can be provided as single stand-alone units, as groups of multiple stand-alone units, in combined structures in which the functionality of multiple sensors are combined into a single unit, etc.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). Wireless communications circuitry 34 may include radio-frequency transceiver circuits for handling multiple radio-frequency communications bands. For example, circuitry 34 may include transceiver circuitry 36 and 38. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as the GSM bands at 850 MHz, 900 MHz, 1800 MHz, and 1900 MHz, and the 2100 MHz data band (as examples). Circuitry 38 may handle voice data and non-voice data. Wireless communications circuitry 34 can include circuitry for other short-range and long-range wireless links if desired. For example, wireless communications circuitry 34 may include global positioning system (GPS) receiver equipment such as GPS receiver circuitry 37 for receiving GPS signals at 1575 MHz or for handling other satellite positioning data, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

With one suitable arrangement, device 10 may have antennas in regions of device 10 such as upper region 22 and lower region 20. One or more upper antennas for device 10 may be formed in region 22. One or more lower antennas for device 10 may be formed in region 20. In devices with other form factors such as laptop and tablet computers, wearable devices, computer monitors with integrated computers, etc., antennas may be located in other suitable regions (e.g., at the four corners of a rectangular device, on front and back surfaces, along edge regions of a device, in one or more arrays, etc.

Figure 3:
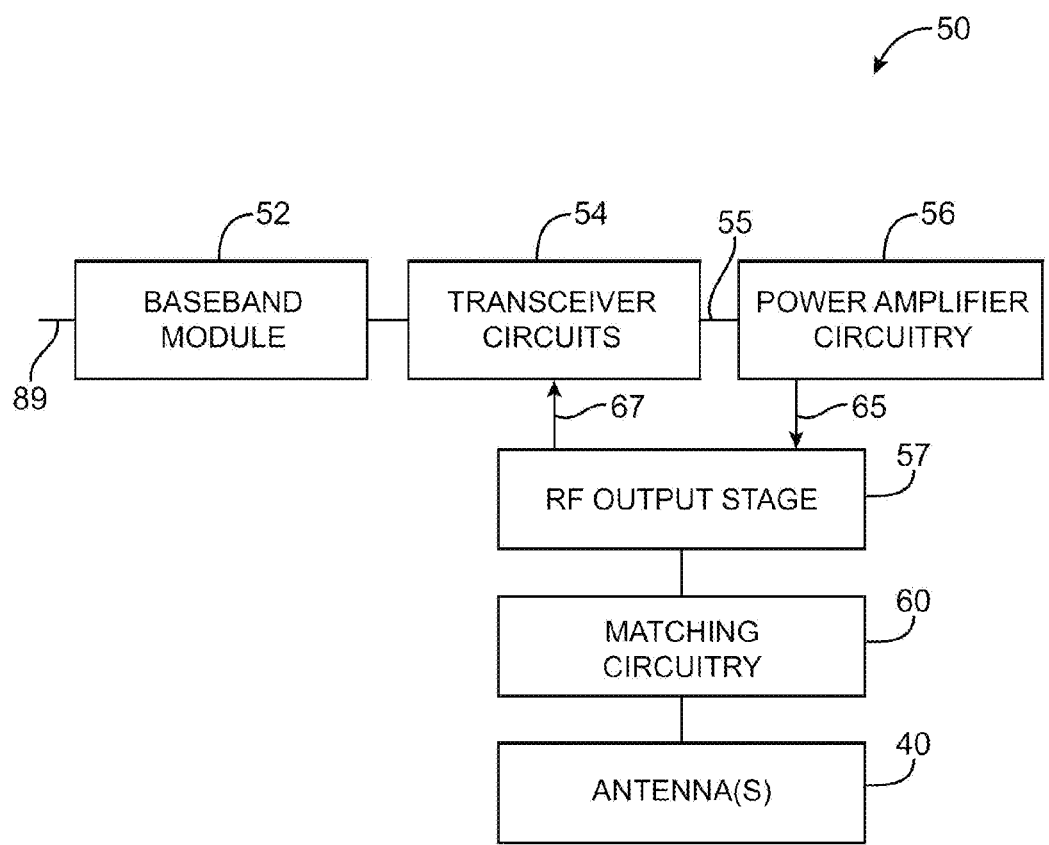
FIG. 3 is circuit diagram of illustrative wireless circuitry in an electronic device in accordance with an embodiment of the present invention.

Illustrative wireless communications circuitry that may be used in circuitry 34 of FIG. 2 in device 10 is shown in FIG. 3. As shown in FIG. 3, wireless communications circuitry 50 may include one or more antennas such as antennas 40. Baseband module 52 may be implemented using a single integrated circuit (e.g., a baseband processor integrated circuit) or using multiple circuits. Baseband processor 52 may receive signals to be transmitted over antennas 40 at input line 89 (e.g., from storage and processing circuitry 28). Baseband processor 52 may provide signals that are to be transmitted to transmitter circuitry within RF transceiver circuitry 54. The transmitter circuitry may be coupled to power amplifier circuitry 56 via path 55. Control signals from storage and processing circuitry 28 (FIG. 1) may be used to control the power of the radio-frequency signals that the transmitter circuitry within transceiver circuitry 54 supplies to the input of power amplifier circuitry 56 via path 55.

During data transmission, power amplifier circuitry 56 may boost the output power of transmitted signals to a sufficiently high level to ensure adequate signal transmission. Amplified signals may be supplied to circuitry 57 on output path 65. Radio-frequency (RF) output stage circuitry 57 may contain radio-frequency switches and passive elements such as duplexers and diplexers. The switches in RF output stage circuitry 57 may, if desired, be used to switch circuitry 50 between a transmitting mode and a receiving mode. Duplexer and diplexer circuits and other passive components in RF output stage 57 may be used to route input and output signals based on their frequency. A connector in stage 57 may allow an external cable to be connected to device 10 for calibration.

Matching circuitry 60 may include a network of components such as resistors, inductors, and capacitors and ensures that antennas 40 are impedance matched to the rest of the circuitry 50. Wireless signals that are received by antennas 40 may be passed to receiver circuitry in transceiver circuitry 54 over a path such as path 67. A low noise amplifier in the receiver circuitry of transceiver circuits 54 may be used to amplify incoming wireless signals from path 67.

Each power amplifier (e.g., each power amplifier in power amplifiers 56) may include one or more power amplifier stages. As an example, each power amplifier may be used to handle a separate communications band and each such power amplifier may have three series-connected power amplifier stages. Circuitry 56 and the amplifier stages in circuitry 56 may have inputs that receive control signals and power supply signals that may be adjusted to selectively turn on and off gain stages and that may be otherwise adjusted to control the output power of the radio-frequency antenna signals on path 65. Output power can also be controlled by adjusting the power on path 55 (e.g., using transceiver circuitry 54). By adjusting wireless circuitry 50 in this way, the transmitted power of the radio-frequency antenna signals that pass through antennas 40 may be adjusted in real time. For example, transmitted antenna signal power may be adjusted in real time in response to the detection of the presence of a user's body or other external object in the presence of device 10 and antennas 40.

Wireless circuitry 50 may include radio-frequency signal monitoring circuitry that may be used in implementing an antenna-based proximity sensor. The radio-frequency signal monitoring circuitry may measure the phase and magnitude of antenna signals associated with antennas 40. Based on this radio-frequency signal information, storage and processing circuitry 28 (FIG. 1) can determine whether the behavior of antennas 40 are being influenced by the presence of a user's body or other external object. When a user's body or other object is detected, the output power of the radio-frequency signals passing through antenna 40 can be lowered to ensure that regulatory limits are satisfied or other suitable actions may be taken.

Figure 4:
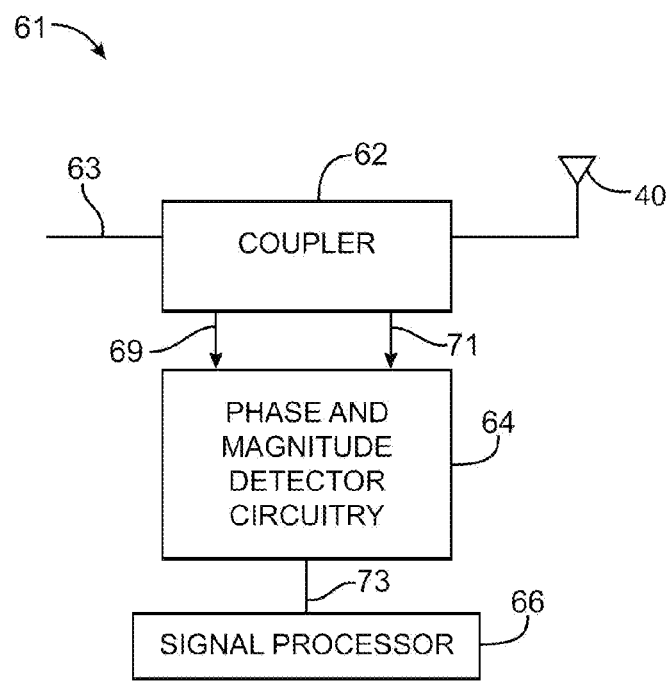
FIG. 4 is a circuit diagram showing illustrative circuitry that may be used to measure radio-frequency antenna signals in real time during operation of an electronic device in accordance with an embodiment of the present invention.

Illustrative wireless circuitry 61 that may be used in implementing an antenna-based proximity sensor of this type is shown in FIG. 4. As shown in FIG. 4, wireless circuitry 61 may receive transmitted radio-frequency antenna signals on path 63 (e.g., from power amplifier circuitry 56, output stage 57, matching circuitry 60, etc.). Coupler 62 may route the transmitted radio-frequency antenna signals to antenna 40, so that these signals are transmitted over the air to a remote receiver.

Coupler 62 may also serve as a tap that routes a fraction of the transmitted signals from path 63 to phase and magnitude detector circuitry 64 over path 69. Radio-frequency antenna signals that are received by coupler 62 from antenna 40 (e.g., transmitted signals that have reflected from antenna 40) may be routed to phase and magnitude detector circuitry 64. Radio-frequency signal phase and magnitude detector circuitry 64 may monitor the values of the signals on paths 69 and 71 and may generate corresponding measured phase and magnitude information that is passed to signal processor 66 over path 73. Circuitry such as circuitry 64 and 66 may be implemented using dedicated hardware, one or more general purpose processors, digital signal processing circuitry, or other suitable control circuitry (e.g., storage and processing circuitry 28 of FIG. 1).

Antenna signal monitoring circuitry 61 may be used to monitor one, two, more than two, or all of the antennas 40 in device 10. Using antenna signal monitoring circuitry such as circuitry 61 of FIG. 4, the behavior of each of antennas 40 and therefore information on the environment in which each of antennas 40 is operating may be measured in real time. This information may be used as antenna-based proximity sensor data (i.e., circuitry 61 may be used to serve as one or more proximity sensors that are sensitive to the presence of external objects in the vicinity of each of antennas 40). Whenever the measurements of circuitry 61 and the information of other sensors in device 10 indicate that a user's body or other external object is in the vicinity of device 10 or a particular antenna 40 in device 10 (i.e., closer than a threshold distance), device 10 may take appropriate actions.

Circuitry 61 may be used to make real-time antenna impedance measurements, as illustrated in connection with the Smith chart of FIG. 5. In the Smith chart of FIG. 5, antenna impedances for an illustrative one of antennas 40 are measured as a function of several different operating conditions. A fifty ohm antenna impedance is characterized by impedance point 80 in the chart of FIG. 5. An antenna with an impedance close to point 80 may be considered well matched to a fifty ohm transmission line in device 10.

Figure 5:
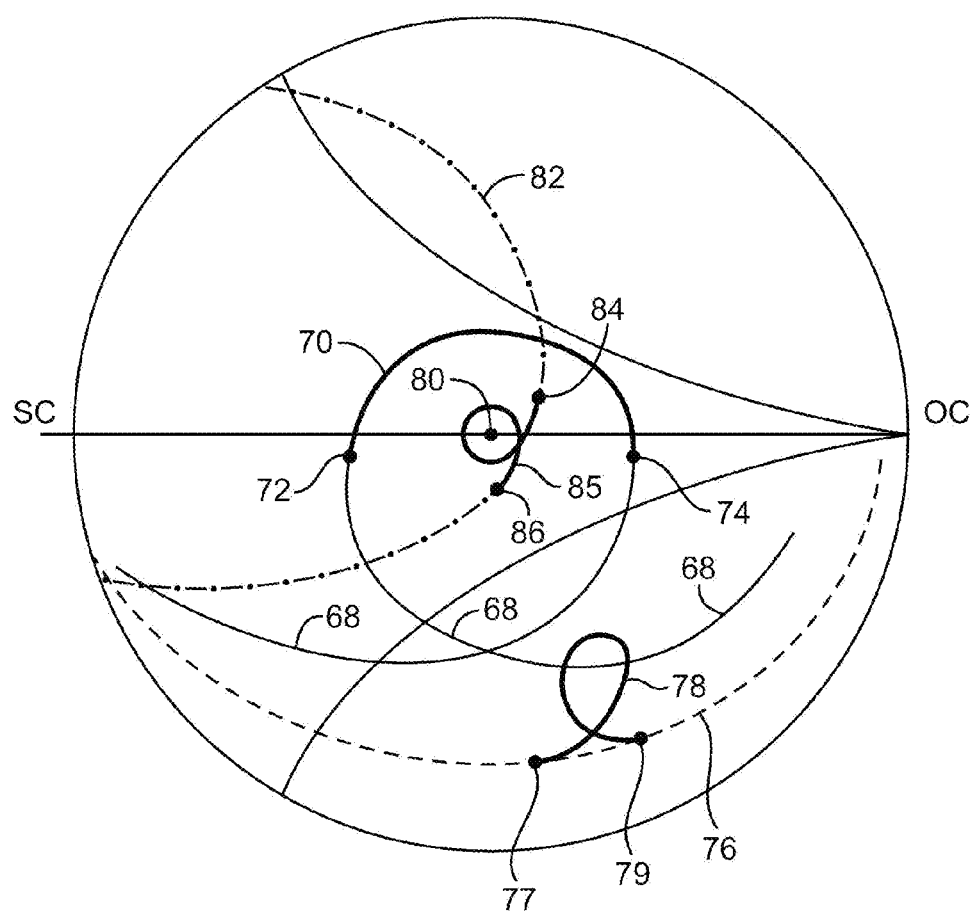
FIG. 5 is a Smith chart showing how antenna impedance may vary in response to the presence or absence of different types of external objects in accordance with an embodiment of the present invention.

Data points for the curves of FIG. 5 may be gathered in real time using circuitry 61. Impedance data may be gathered while transceiver circuitry 54 is transmitting wireless data signals during normal operation (e.g., while transceiver circuitry 54 is transmitting data over a local or remote wireless communications link). In this type of arrangement, impedance measurements may be made using an in-band arrangement (e.g., measurements may be made in the communications band being used by device 10 to transmit wireless data). In addition, or as an alternative, a tunable radio-frequency source in transceiver circuits 54 may produce a probe frequency that is swept through frequencies of interest while circuitry 61 gathers phase and magnitude data that is converted to impedance data points. The probe frequency may be restricted to in-band frequencies (i.e., frequencies on segment 70) or may involve the use of out-of-band frequencies (i.e., frequencies elsewhere on curve 68). In-band and out-of-band antenna impedance measurements such as these may be made periodically, whenever normal transceiver circuitry in device 10 is quiescent, when other proximity sensors indicate that an external object might be present, when other criteria are satisfied, etc.

The example of FIG. 5 illustrates how antenna impedance is influenced by the environment in which device 10 operates. In the absence of any external objects, an antenna in device 10 may, for example, be characterized by a curve such as curve 68. Darkened line segment 70, which extends between band edge point 72 and band edge point 74 may correspond to the antenna impedances associated with a communications band of interest.

If an external object such as a metal surface or a user's hand comes into contact with an antenna 40 (e.g., if device 10 is placed on a metal surface or if a user grips device 10 so that the user's hand or other body part is flush with an antenna feed portion of antenna 40), the impedance of antenna 40 may change. For example, the impedance of antenna 40 may be characterized by a curve such as curve 76. Darkened line segment 78, which extends between band edge point 77 and band edge point 79 may correspond to the antenna impedances associated with the communications band of interest under these new operating conditions. Circuitry 61 may detect the transformation of curve segment 70 into curve segment 78 on characteristic curve 76 and may therefore conclude that device 10 is in the vicinity of a metal surface or user's hand.

In the presence of portions of the human body or other external objects that exhibit significant losses, the impedance of the antenna may be characterized by a curve such as curve 82. In this type of situation, curve segment 70 is transformed into a curve segment such as curve segment 85, extending from point 86 to point 84 on curve 82. Due to the losses produced by the external object, there may be a relatively modest number of signal reflections, resulting in a curve segment location that is relatively close to point 80.

Actions that may be taken when close proximity of an external object to one or more antennas is detected may include tuning antennas in device 10, tuning matching circuitry in device 10, tuning antenna feeds in device 10, etc.

Figure 6:
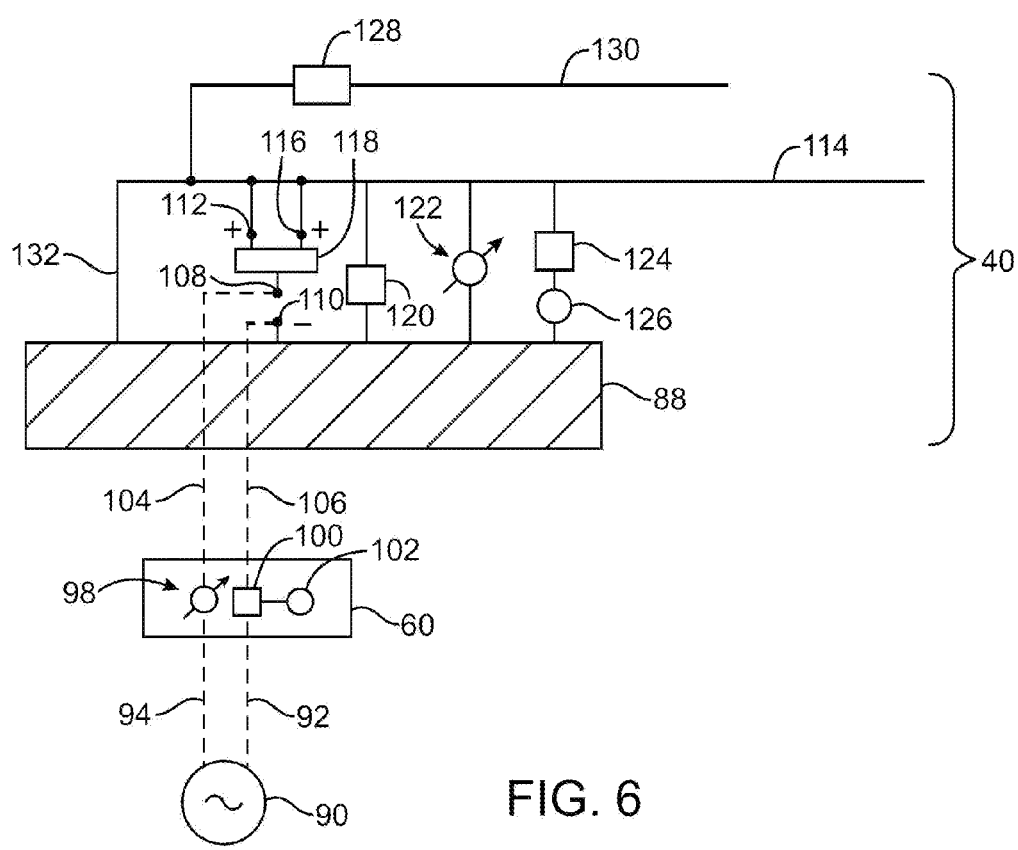
FIG. 6 is a diagram of an illustrative adjustable antenna matching circuit, an illustrative adjustable antenna feed, illustrative adjustable antenna tuning circuitry, and an adjustable antenna resonating element for an adjustable antenna in accordance with an embodiment of the present invention.

Consider, as an example, the illustrative antenna of FIG. 6. Antenna 40 in the FIG. 6 example has an inverted-F configuration. Main resonating element arm 114 is connected to ground 88 through a short circuit path such as path 132, a feed path (see, e.g., terminals 110 and 108), and one or more optional paths such as the path formed by element 120 (e.g., a switch), the path formed by element 122, and the path formed by elements 124 and 126. Optional antenna resonating element branches such as branch 130 may be coupled to antenna 40 (e.g., by connecting branch 130 to main resonating element arm 114).

As shown in FIG. 6, antenna 40 may be feed from a source such as source 90 (i.e., transceiver circuitry such as transceiver circuitry 54 of FIG. 3). A transmission line having paths such as positive antenna signal path 94 and ground antenna signal path 92 may be used to convey radio-frequency antenna signals from source 90 to antenna 40.

Matching circuitry 60 may be interposed in the path between source 90 and antenna 40. Matching circuitry 60 may include series-connected and shunt-connected tunable components such as tunable component 98. Component 98 may be a tunable capacitor, a tunable inductor, a tunable resistor, a tunable component or network that includes multiple components of this type, a tunable network that includes a mixture of fixed and tunable components, etc.

If desired, controllable switches such as switch 100 may be used to selectively adjust circuitry 60. Switches such as switch 100 may be radio-frequency switches that are implemented using microelectromechanical systems (MEMS) technology, using field-effect transistor devices, or other suitable switch arrangements. As illustrated in the example of FIG. 6, switches such as switch 100 may be used to selectively connect circuit elements such as circuit element 102 to paths 94 and 92 (i.e., in a series or shunt configuration or as part of a more complex network). Circuit element 102 may be a fixed or adjustable component such as a resistor, capacitor, inductor, etc.

Transmission line paths such as positive transmission line path 104 and ground transmission line path 106 may be used to interconnect matching circuitry 60 to the antenna feed of antenna 40. The antenna feed may have a fixed or tunable configuration. In the example of FIG. 6, the antenna feed for antenna 40 is tunable between a first antenna feed configuration in which switch 118 has a first position and a second antenna feed configuration in which switch 118 has a second position. When switch 118 is in its first position, terminal 108 is connected to terminal 112, so that terminal 112 serves as the positive antenna feed terminal for antenna 40. When switch 118 is in its second position, terminal 108 is connected to terminal 116, so that terminal 116 serves as the positive antenna feed terminal for antenna 40. Feed terminals 112 and 116 are located at different positions along the length of main resonating element arm 114, so the impedance and therefore the frequency response of antenna 40 can be adjusted by using switch 118 to control the feed location in antenna 40. The arrangement of FIG. 6 is merely illustrative. In general, antennas such as antenna 40 in device 10 may have tunable feeds formed from two or more feed points, tunable feeds that involve one, two, three, or more than three switches, non-tunable feeds, etc.

As shown in FIG. 6, antenna 40 may have a resonating element that is composed of tunable elements. This allows the size and shape of the resonating element in antenna 40 to be controlled by storage and processing circuitry 28. In the FIG. 6 arrangement, switch 128 may have two states (as an example). In its first state, switch 128 may be open. This electrically disconnects antenna resonating element portion 130 from antenna resonating element portion 114. In its second state, switch 128 may be closed. When switch 128 is closed, resonating element arm portion 130 is electrically connected to arm 114, thereby adjusting the size and shape of the antenna resonating element and adjusting the frequency response of the antenna. Additional resonating element structures may likewise be selectively connected and disconnected from the antenna resonating element in antenna 40 if desired. Circuit components (e.g., resistors, inductors, and capacitors) may be interconnected with switches such as switch 128 (e.g., for impedance matching).

Antenna 40 may also be adjusted by controlling components such as switch 120 and tunable component 122. Switches such as switch 120 (e.g., a MEMs or transistor switch) may be opened and closed to tune antenna 40. Tunable component 122 may be a tunable capacitor, tunable resistor, tunable inductor, or other suitable circuitry having a tunable impedance that can be adjusted to tune antenna 40. In the FIG. 6 example, tunable component 122 has been connected between antenna resonating element arm 114 and ground antenna element 88, but this is merely illustrative. Tunable components such as component 122 may be connected in series with antenna resonating element branches such as branches 114 and 130, may be connected in series with short circuit antenna branch 132, may be connected in parallel with these antenna structures, or may otherwise be interconnected with the components of antenna 40.

Tuning capabilities for antenna 40 may also be implemented using switches such as switch 120 and switch 124. Switches 120 and 124 may, for example, be controlled by storage and processing circuitry 28. When switch 124 is in its open position, component 126 may be disconnected from antenna 40. When switch 124 is in its closed position, component 126 may be connected between resonating element arm 114 and ground 88. Adjustable circuits such as these may be interconnected in series or parallel with any suitable antenna component (e.g., arm 130, arm 132, arm 114, ground 88, etc.). Fixed components such as capacitors, resistors, and inductors may also be included in the tuning circuitry of antenna 40.

These antenna adjustment schemes may be used individually or together. For example, antenna 40 can be adjusted by adjusting a matching network that is coupled to the antenna's transmission line, by adjusting the position of the antenna feed (e.g., using switching circuitry), by adjusting antenna tuning (e.g., by using switches and/or tunable circuit components), and by adjusting the size and shape of the antenna itself (e.g., by using switches or other controllable circuit components to selectively change the size and shape of the antenna resonating element, the antenna ground, or parasitic antenna elements). If desired, only some or only one of these adjustment mechanisms may be included in antenna 40. The arrangement of FIG. 6 is an example.

Figure 7:
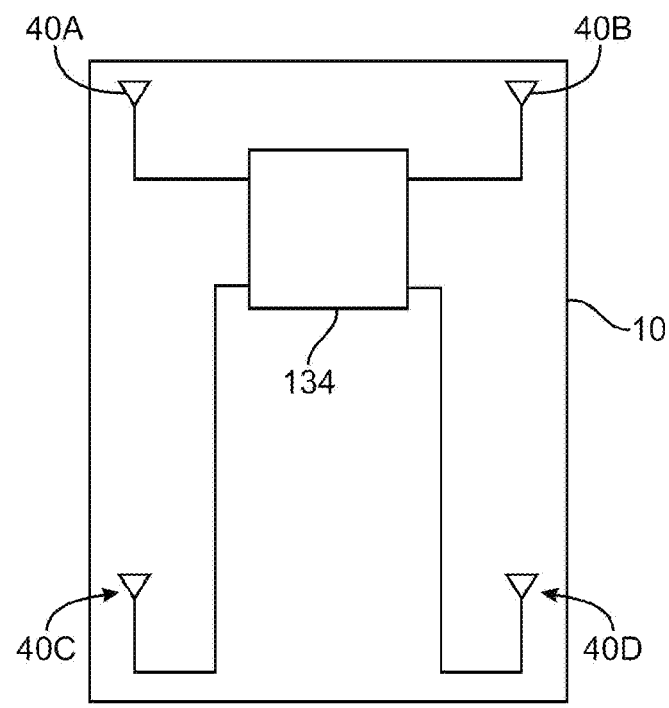
FIG. 7 is a schematic diagram of an illustrative electronic device with multiple antennas in accordance with an embodiment of the present invention.

FIG. 7 is a top view of an illustrative electronic device that has a rectangular outline. As shown in FIG. 7, antennas may be mounted in four corners of device 10. For example, antenna 40A may be mounted in an upper left corner, antenna 40B may be mounted in an upper right corner, antenna 40C may be located in a lower left corner, and antenna 40D may be located in a lower right corner. If desired, additional antennas may be mounted in device 10 (e.g., at one or more midpoints along the edges of device 10, at interior locations, on external antenna mounts, etc.).

Control circuitry 134 (e.g., storage and processing circuitry and wireless circuitry) may be used in gathering antenna signals from antennas 40A, 40B, 40C, and 40D (e.g., for implementing antenna-based proximity sensors) and may be used in controlling antennas 40A, 40B, 40C, and 40D. For example, antenna adjustments may be made to antennas 40A, 40B, 40C, and 40D using antenna control techniques of the type described in connection with FIG. 6. These antenna adjustments may be used to control the bandwidth of the antennas, the communications bands covered by the antennas, the impedance of the antennas, etc. Each antenna may have associated wireless circuits such as circuitry 50 of FIG. 3. This circuitry may be adjusted to control the output power of each antenna. For example, the power that is transmitted by antennas that are near to external objects can be reduced or these antennas can be temporarily deactivated. If, as an example, an external object is detected in the vicinity of antenna 40B, antenna 40B can be deactivated and one, two, or three of the remaining antennas 40A, 40C, and 40D may be used. Adjustments may also be made to the type of communications scheme that is being used during data transmissions. For example, a MIMO scheme may be used that involves use of all four antennas (40A, 40B, 40C, and 40D) of FIG. 7. If an external object is detected in the vicinity of antennas 40A, 40B, and 40C (as an example), use of the MIMO scheme can be halted and an alternate scheme may be used such as a multiple-input-single-output communications scheme that uses only a single antenna such as antenna 40D to transmit signals. Combinations of these approaches may be used if desired.

Figure 8:
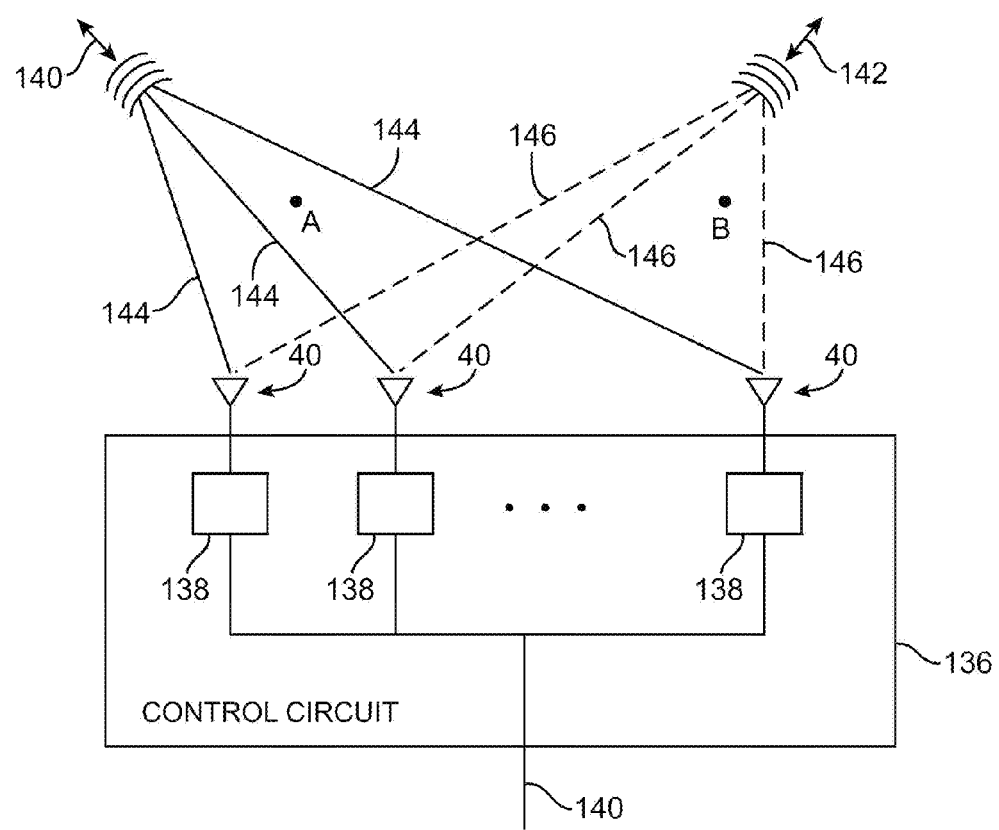
FIG. 8 is a diagram of an illustrative phased antenna array that may be adjusted in real time using control circuitry in an electronic device in accordance with an embodiment of the present invention.

Device 10 may include a phased antenna array such as the array shown in FIG. 8. As shown in FIG. 8, an array of antennas 40 may be coupled to a signal path such as path 140. During signal transmission operations, path 140 may be used to supply radio-frequency antenna signals to the antenna array for transmission to external wireless equipment. During signal reception operations, path 140 may be used to route radio-frequency antenna signals that have been received by antennas 40 from external wireless equipment to receiver circuitry in device 10.

The use of multiple antennas in array 40 allows beam steering arrangements to be implemented by controlling the relative phases of the signals for the antennas. In the example of FIG. 8, antennas 40 each have a corresponding radio-frequency phase controller 138. There may be, for example, 3-30 (or 5-20) antennas 40 and 3-30 (or 5-20) corresponding phase control circuits 138.

Control circuitry 136 may use phase controllers 138 or other suitable phase control circuitry to adjust the relative phases of the transmitted radio-frequency antenna signals that are provide to each of the antennas in the antenna array. If, for example, control circuitry 136 is adjusted to produce a first set of phases on the transmitted signals, transmitted signals 144 from antennas 40 will form a radio-frequency beam such as beam 144 that is oriented in the direction of point A. If, however, control circuitry 136 adjusts phase controllers 138 to produce a second set of phases with controllers 138, transmitted signals 146 will form a radio-frequency beam such as beam 142 that is oriented in the direction of point B. Phase tuning can also be used steer the direction of the antenna array during signal reception operations. With one suitable arrangement, the array of antennas in FIG. 8 may be used to handle a communications band such as a communications band at 60 GHz (as an example). Wireless communications in other frequency bands of interest may also be supported.

During normal operations, the settings of control circuitry 136 may be adjusted in real time to maximize signal strength (e.g., to maximize signal-to-noise ratio) or otherwise optimize performance. If, however, an external object such as a user's body is detected in the proximity of device 10, control circuitry 136 may be used to steer the direction in which the antenna array operates so as to bypass the external object. As an example, if a proximity sensor or other sensor detects that an external object is located at point A, control circuitry 136 may be used to adjust the antenna array so that the antenna sends and receives signals along path 142 in the direction of point B. Antenna steering can be used in combination with other responses to detected objects (e.g., selective or collective transmit power reductions, communications mode adjustments, communications band adjustments, etc.).

Figure 9:
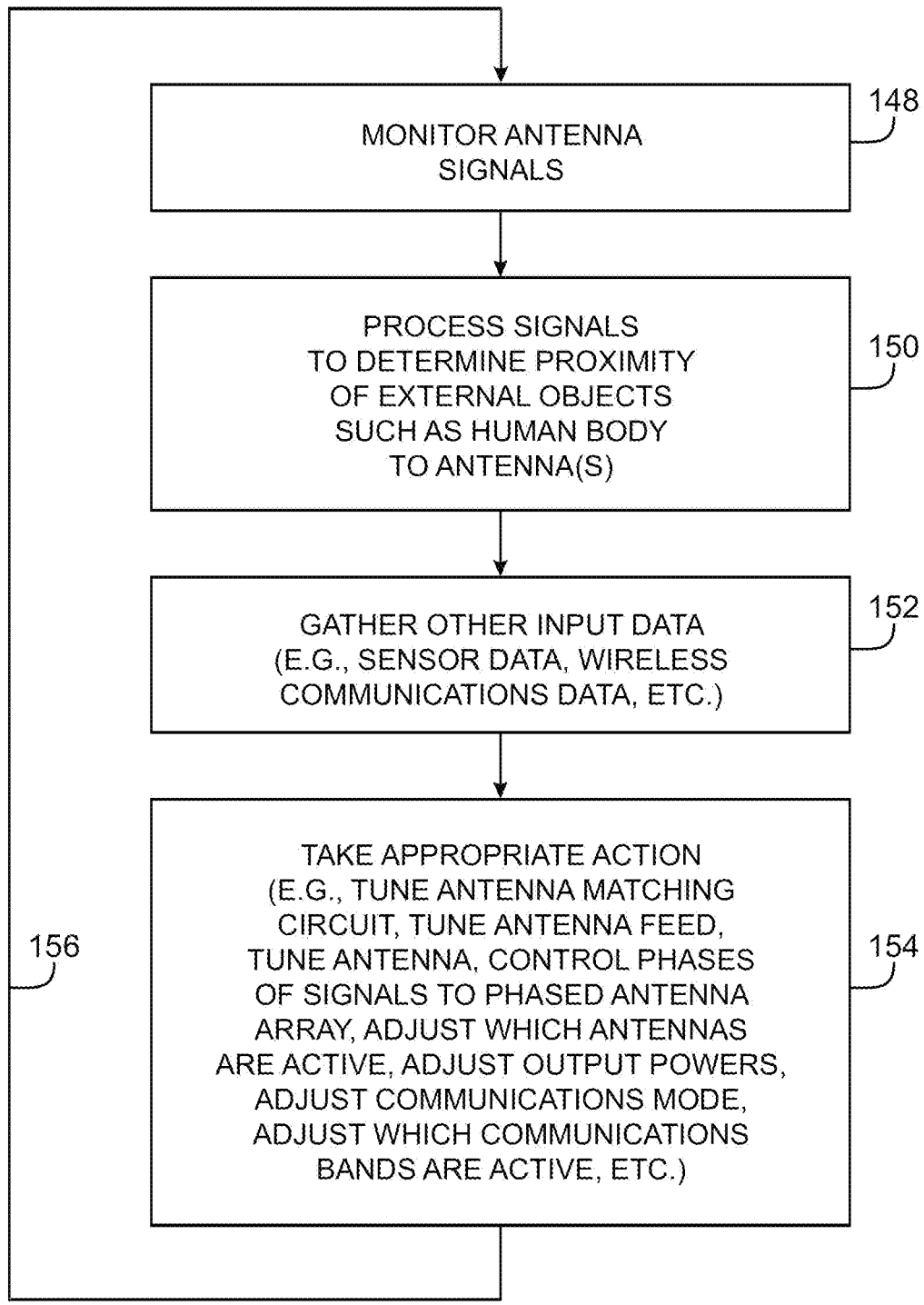
FIG. 9 is a flow chart of illustrative steps involved in operating an electronic device with sensors and wireless circuitry in accordance with an embodiment of the present invention.

Illustrative steps involved in using an electronic device in which actions may be taken in response to detected objects in the vicinity of the device and its antennas are shown in FIG. 9.

At step 148, antenna signal monitoring circuitry such as circuitry 61 of FIG. 4 may be used to make real time measurements of the impedance of antenna 40. One or more of the antennas (i.e., all of the antennas) in device 10 may be monitored in this way. Phase and magnitude detector circuitry 64 can use information such as phase and magnitude information on tapped outgoing radio-frequency antenna signals and the tapped reflected radio-frequency antenna signals to determine the impedance of antenna 40. As described in connection with the Smith chart of FIG. 5, the impedance of each antenna may be monitored at in-band frequencies or at out-of-band frequencies. An optional signal generator may be used to generate test signals or, if desired, signal measurements may be made using existing transmitted data signals.

At step 150, storage and processing circuitry 28 (FIG. 2) may be used to analyze the antenna impedance measurements from circuitry 61. The results of this analysis may reveal, as an example, that a user's body or other external object is located in the vicinity of certain antennas in device 10, as described in connection with FIG. 5.

At step 152, storage and processing circuitry 28 may gather additional information on the state of device 10. For example, storage and processing circuitry 28 may gather information on which communications bands are being used in wirelessly communicating with external equipment, may gather information on current transmit power settings, may gather sensor information from additional sensors (e.g., the sensors of FIG. 2), etc.

At step 154, storage and processing circuitry 28 may process the signals from the antenna-based proximity sensor (i.e., circuitry 61), the sensors of FIG. 2, and other circuitry in device 10 to determine whether antenna adjustments and other adjustments to the operation of the wireless circuitry of device 10 should be made. During the processing of step 154, device 10 may, for example, determine, for each antenna 40, whether an external object such as a user's body is in the vicinity of the antenna. A weighting scheme may be used to weight data from different sensors.

As an example, consider a device that contains three antennas and corresponding antenna-based sensors of the type shown in FIG. 4, light-based proximity sensor such as sensors 45, and capacitance-based proximity sensors such as sensors 44 (as examples). The light-based and capacitance-based sensors may be located adjacent to respective antennas. Measurements from the antenna-based sensors may indicate that an external object is blocking the first antenna (i.e., these measurements may indicate that an external object is adjacent to the first antenna and is therefore within a given distance of the first antenna). The capacitance-based sensors may produce identical results, but the light-based sensor may indicate that both the first and second antennas are blocked. By analyzing data from all three sensors, device 10 can determine whether external objects are in the vicinity of each antenna and can determine a suitable course of action.

For example, device 10 can inhibit operation of the first and second antennas in favor of the third antenna, device 10 can turn off all three antennas, or device 10 can reduce power to the first and second antennas while continuing to operate all three antennas. Device 10 may also make adjustments to each antenna by controlling antenna matching circuitry, antenna feeds, antenna resonating elements, and antenna tuning circuits as described in connection with FIG. 6. In devices that contain a phased antenna array, the direction of the signal beam associated with the antenna may be steered in response to the proximity information. For example, if an external object is detected in one location, the array can be adjusted so that antenna signals are oriented in a different direction.

The actions that are taken at step 154 in response to processing the data that has been gathered may include adjustments to the communications band that is being used by the wireless circuitry (e.g., by shifting from a 5.0 GHz band to a 2.4 GHz band so that more appropriate antennas may be used). Device 10 may also decide to cease MIMO operation (e.g., so that a blocked antenna is not used for signal transmission or is not used for signal transmission or reception). If it is desired to reduce transmit powers, device 10 may also decide to reduce data rates to sustainable levels (i.e., levels that are appropriate to the amount of signal strength that is available).

If desired, the operations of steps 148, 150, 152, and 154 may be implemented in a device without extensive redundant antenna resources. For example, a device may have only one cellular telephone antenna. Circuitry 61 of FIG. 4 may be used to monitor the impedance of the antenna in real time. Device 10 may reduce the output power of the antenna when impedance measurements of the type described in connection with FIG. 7 reveal that an external object is partly or completely blocking the antenna.

In general, any suitable information may be used in determining what actions are appropriate when adjusting the antennas. For example, information from the sensors of FIG. 2, from application software, from circuitry 61 of FIG. 4, and other information may be processed by device 10 to determine whether an external object is adjacent to the antenna (e.g., whether an external object is within the vicinity of the antenna by virtue of being within a given threshold distance of the antenna). In response, device 10 may reduce or otherwise adjust antenna powers and other antenna circuit attributes, may control communications modes, may control communications bands, antenna phases, etc. As indicated by line 156 in FIG. 9, these operations may be repeated (e.g., continuously) during operation of device 10.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   an antenna with which the electronic device transmits radio-frequency signals;
   phase and magnitude detector circuitry that is coupled to the antenna and that makes radio-frequency signal phase and magnitude measurements;
   storage and processing circuitry that determines whether an external object is adjacent to the antenna by processing the radio-frequency signal phase and magnitude measurements; and
   wireless circuitry that uses the antenna to transmit the radio-frequency signals at a given transmit power, wherein the storage and processing circuitry is configured to adjust the transmit power based on the radio-frequency signal phase and magnitude measurements, wherein the storage and processing circuitry is further configured to reduce the transmit power in response to determining that the external object is adjacent to the antenna by processing the radio-frequency signal phase and magnitude measurements, wherein the antenna is included in a plurality of antennas that are operable to transmit the radio-frequency signals, wherein the phase and magnitude detector circuitry is coupled to each of the plurality of antennas, wherein the storage and processing circuitry determines for each antenna whether the external object is adjacent to that antenna, and wherein the storage and processing circuitry is configured to temporarily disable a given antenna of the plurality of antennas in response to determining that the external object is adjacent to the given antenna.

2. The electronic device defined in claim 1 wherein the wireless circuitry comprises:
   a transceiver; and
   power amplifier circuitry, wherein the storage and processing circuitry is configured to lower the transmit power by adjusting the transceiver and power amplifier circuitry when it is determined that the external object is within a given distance of the antenna.

3. The electronic device defined in claim 1 further comprising a capacitive proximity sensor, wherein the storage and processing circuitry is configured to adjust the transmit power based on the radio-frequency signal phase and magnitude measurements and based on data from the capacitive proximity sensor.

4. The electronic device defined in claim 1 further comprising a motion sensor, wherein the storage and processing circuitry is configured to adjust the transmit power based on the radio-frequency signal phase and magnitude measurements and based on data from the motion sensor.

5. The electronic device defined in claim 1 further comprising at least first and second sensors, wherein the storage and processing circuitry is configured to adjust the transmit power based on the radio-frequency signal phase and magnitude measurements and based on data from the first and second sensors.

6. The electronic device defined in claim 1 further comprising a proximity sensor, wherein the storage and processing circuitry is configured to adjust the transmit power based on the radio-frequency signal phase and magnitude measurements and based on data from the proximity sensor.

7. A method of using an electronic device, comprising:
   transmitting radio-frequency antenna signals through an antenna in the electronic device at a transmit power;
   with phase and magnitude detector circuitry that is coupled to the antenna in the electronic device, making radio-frequency antenna signal phase and magnitude measurements to determine whether an external object is adjacent to the antenna;
   in response to determining that the external object is within a given distance of the antenna using the phase and magnitude detector circuitry, reducing the transmit power;
   gathering sensor input data from a proximity sensor; and
   weighting data from the phase and magnitude circuitry and data from the proximity sensor using a weighting scheme, wherein adjusting the transmit power comprises adjusting the transmit power based on the weighted data from the phase and magnitude detector circuitry and from the proximity sensor.

8. The method defined in claim 7 further comprising:
   gathering sensor input data from a motion sensor, wherein adjusting the transmit power comprises adjusting the transmit power based on information from the phase and magnitude detector circuitry and from the motion sensor.

9. The method defined in claim 7 further comprising:
   gathering sensor input data from an infrared heat sensor, wherein adjusting the transmit power comprises adjusting the transmit power based on information from the phase and magnitude detector circuitry and from the infrared heat sensor.

10. A method of using an electronic device, comprising:
    transmitting radio-frequency antenna signals through an antenna in the electronic device at a transmit power;
    with phase and magnitude detector circuitry that is coupled to the antenna in the electronic device, making radio-frequency antenna signal phase and magnitude measurements to determine whether an external object is adjacent to the antenna;
    in response to determining that the external object is within a given distance of the antenna using the phase and magnitude detector circuitry, reducing the transmit power; and
    gathering sensor input data from a sensor selected from the group consisting of: a camera sensor and an acoustic sensor, wherein adjusting the transmit power comprises adjusting the transmit power based on information from the phase and magnitude detector circuitry and from the sensor.

11. A portable electronic device comprising:
    at least one antenna having an antenna impedance; and
    circuitry that determines whether an external object is adjacent to the antenna by making phase and magnitude measurements on radio-frequency antenna signals associated with the antenna to monitor the antenna impedance, wherein the at least one antenna comprises an antenna in a phased antenna array and wherein the circuitry is configured to adjust the phased antenna array based on the phase and magnitude measurements, wherein the antenna comprises multiple resonating element arms and a switch that selectively couples the antenna resonating element arms.

12. The portable electronic device defined in claim 11 wherein the portable electronic device comprises a cellular telephone transceiver coupled to the antenna, wherein the circuitry that determines whether the external object is adjacent to the antenna comprises a coupler interposed between the cellular telephone transceiver and the antenna.

13. The portable electronic device defined in claim 12 wherein the circuitry that determines whether the external object is adjacent to the antenna comprises radio-frequency signal phase and magnitude detector circuitry that receives radio-frequency signals from the coupler.

14. The portable electronic device defined in claim 13 wherein the cellular telephone transceiver transmits signals in a communications band and wherein the radio-frequency signal phase and magnitude detector circuitry is configured to make in-band antenna impedance measurements at frequencies within the communications band.

15. The portable electronic device defined in claim 13 wherein the cellular telephone transceiver transmits signals in a communications band and wherein the radio-frequency signal phase and magnitude detector circuitry is configured to make out-of-band antenna impedance measurements at frequencies outside of the communications band.

16. The portable electronic device defined in claim 11 wherein the portable electronic device comprises a transceiver coupled to the antenna, wherein the transceiver transmits data using a given communications protocol, using a given communications band, and using a given data rate, and wherein the circuitry is configured to adjust a selected one of:
  the given communications protocol, the given communications band, and the given data rate in response to determining that the external object is adjacent to the antenna.

* * * * *